US012690601B2

(12) United States Patent
Senaratne-Lenagala

(10) Patent No.: US 12,690,601 B2
(45) Date of Patent: Jul. 28, 2026

(54) PLANT-BASED DELI MEAT ANALOGUE PRODUCTS COMPRISING TITANIUM DIOXIDE

(71) Applicant: Cargill, Incorporated, Wayzata, MN (US)

(72) Inventor: Lasika Shyamalie Senaratne-Lenagala, Wichita, KS (US)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 18/870,308

(22) PCT Filed: Jul. 26, 2024

(86) PCT No.: PCT/US2024/039727
§ 371 (c)(1),
(2) Date: Nov. 27, 2024

(87) PCT Pub. No.: WO2025/053919
PCT Pub. Date: Mar. 13, 2025

(65) Prior Publication Data
US 2026/0114472 A1       Apr. 30, 2026

Related U.S. Application Data

(60) Provisional application No. 63/580,811, filed on Sep. 6, 2023.

(51) Int. Cl.
*A23L 33/185* (2016.01)
*A23J 3/16* (2006.01)
(Continued)

(52) U.S. Cl.
CPC ................. *A23J 3/16* (2013.01); *A23L 27/26* (2016.08); *A23L 29/015* (2016.08); *A23L 29/219* (2016.08); *A23L 33/185* (2016.08)

(58) Field of Classification Search
None
See application file for complete search history.

(56) References Cited

U.S. PATENT DOCUMENTS 3,790,553 A       2/1974   Rao
5,996,917 A       12/1999  Ehrle
(Continued)

FOREIGN PATENT DOCUMENTS

CA        1331309 C   *  8/1994   ................ A23J 3/18
CA        3222311 A1  * 12/2022   .............. A23J 3/227
(Continued)

OTHER PUBLICATIONS

Field Roast, "Signature Stadium Dog" FieldRoast.com [Online]. Retrieved from the Internet: <URL: https://fieldroast.com/product/signature-stadium-dog/>. Retrieved on Nov. 4, 2021, 3 pages.
(Continued)

*Primary Examiner* — Lien T Tran

(57) ABSTRACT

A plant-based deli meat analogue product is prepared by hydrating non-gluten plant protein with the aqueous titanium dioxide mixture, and then mixing with plant-based oil and hydrocolloid, Vital Wheat Gluten, and edible acid to form a plant-based dough that is formed into a dough log and cooked to an internal temp of at least about 180° F. to form a plant-based deli meat analogue product. By selection of specific ingredients in effective ratios, and mixing the ingredients in a specific order, a plant-based deli meat analogue product may be prepared having excellent appearance and texture.

15 Claims, 3 Drawing Sheets

(51) Int. Cl.
　　*A23L 27/26* 　　(2016.01)
　　*A23L 29/00* 　　(2016.01)
　　*A23L 29/219* 　　(2016.01)

(56) References Cited

U.S. PATENT DOCUMENTS

| | | | |
|---|---|---|---|
| 7,070,827 | B2 | 7/2006 | Cavallini |
| 9,700,067 | B2 | 7/2017 | Fraser |
| 2005/0003071 | A1 | 1/2005 | Cavallini |
| 2009/0208633 | A1 | 8/2009 | Kyed |
| 2013/0243932 | A1 | 9/2013 | Brackenridge |
| 2015/0351440 | A1 | 12/2015 | Cao |
| 2019/0191725 | A1 | 6/2019 | Gladden |
| 2021/0045409 | A1 | 2/2021 | Witteveen et al. |
| 2023/0397627 | A1* | 12/2023 | Munt ..................... A23L 29/10 |
| 2025/0072454 | A1 | 3/2025 | Senaratne-Lenagala |

FOREIGN PATENT DOCUMENTS

| | | | |
|---|---|---|---|
| EP | 0603676 | B1 | 8/1998 |
| EP | 1493337 | A2 | 1/2005 |
| EP | 1817962 | B1 | 11/2011 |
| EP | 3628173 | A1 | 4/2020 |
| GB | 2606409 | A | 11/2022 |
| WO | 2005113236 | A2 | 12/2005 |
| WO | 2017046659 | W | 3/2017 |
| WO | 2017192445 | A1 | 11/2017 |
| WO | 2020074858 | A1 | 4/2020 |
| WO | 2020089445 | A1 | 5/2020 |
| WO | 2021216664 | A1 | 10/2021 |
| WO | 2021219845 | A1 | 11/2021 |
| WO | 2022086978 | A1 | 4/2022 |
| WO | 2023039555 | A1 | 3/2023 |
| WO | 2023049750 | A1 | 3/2023 |
| WO | 2023052492 | A1 | 4/2023 |
| WO | 2025/053920 | A1 | 3/2025 |

OTHER PUBLICATIONS

Groves, Melissa, "Vegan Meat Substitutes: The Ultimate Guide", Healthline, Aug. 16, 2018, retrieved from the Internet: <URL: https://www.healthline.com/nutrition/vegan-meat-substitutes#section4>, 17 pages.

Hackett, "How to make Seitan," TheSpruceEats.com [Online] Mar. 29, 2021. Retrieved from the Internet: <URL: https://www.thespruceeats.com/how-to-make-seitan-3376639>, retrieved on May 4, 2023, 5 pages.

Hackett, "What Is Seitan? A Guide to Buying, Cooking, and Storing Seitan," TheSpruceEats.com [Online] Dec. 26, 2022. Retrieved from the Internet: <URL: https://www.thespruceeats.com/what-is-seitan-3376819>, retrieved on May 4, 2023, 7 pages.

Hu et al., "Partial removal of acetyl groups in konjac glucomannan significantly improved the rheological properties and texture of konjac glucomannan and κ-carrageenan blends." International journal of biological macromolecules. Feb. 15, 2019; 123:1165-1171.

Huang et al., "Create fat substitute from soybean protein Isolate/konjac glucomannan: The impact of the protein and polysaccharide concentrations formulations." Frontiers in Nutrition 9 (2022). 13 pages.

Ingredion, "Ticagel Kinjac High Viscosity" technical specification, Nov. 10, 2023, 1 page.

LightLife Foods, Inc., "Smart Dogs" LightLife.com [Online]. Retrieved from the Internet: <URL: https://lightlife.com/en-ca/product/smart-dogs/>. Retrieved on Jan. 3, 2022, 7 pages.

Starr, "How to Make Seitan from Any Flour: A Complete Guide," BackyardHomesteadHQ.com [Online], Apr. 24, 2023. Retrieved from the Internet: <URL: https://backyardhomesteadhq.com/how-to-make-seitan-from-any-flour-a-complete-guide/>, retrieved on May 3, 2023, 12 pages.

\* cited by examiner

Comparative product

1

PLANT-BASED DELI MEAT ANALOGUE PRODUCTS COMPRISING TITANIUM DIOXIDE

CROSS-REFERENCE TO RELATED APPLICATIONS

This application is a national phase application of PCT Application No. PCT/US2024/039727, filed Jul. 26, 2024, which claims the benefit of U.S. Provisional Application No. 63/580,811, filed Sep. 6, 2023, each of which is incorporated by reference herein in its entirety.

FIELD

The present invention relates to plant-based deli meat analogue products.

BACKGROUND

Consumers increasingly desire protein choices that are alternatives to animal meat protein for a variety of reasons. At the same time, many consumers enjoy the flavors and textures that are uniquely provided by meats obtained from animals. For this reason, a number of companies have striven to provide plant-based meat substitutes that replicate the experience of cooking and eating meat.

Examples of plant-based meat substitute products include the Impossible Burger from Impossible Foods, The Beyond Burger from Beyond Meat, and Ultimate Beefless Burger from Gardein. These and other products are discussed, for example, at https://www.healthline.com/nutrition/vegan-meat-substitutes #section4, which states that the Beyond Burger is made from pea protein, canola oil, coconut oil, potato starch and other ingredients.

Likewise, extruded meat substitute compositions are described in WO 2017/046659 that comprise one or more sources of non-gluten plant protein, one or more sources of lipid, one or more sources of carbohydrate, and water, wherein the one or more sources of carbohydrate may in some embodiments comprise fruit, fruit powder or chia seed extract, or any combination of any two or more thereof. In this composition, the sources of lipid may comprise a plant fat or oil; over 60 such oils are listed.

A meat substitute product made from wheat called "wheat meat" or "seitan" is known and can be used as a basis for vegetarian products. https://www.thespruceeats.com/what-is-seitan-3376819. Home recipes for making seitan are known, such as described at https://www.thespruceeats.com/how-to-make-seitan-3376639. Such recipes describe a simple process of combining ingredients such as vital wheat gluten flour, chickpea flour, nutritional yeast, ground ginger, and garlic powder in a bowl, mixing, kneading and cooking the product. US Patent Application Publication No. 2019/0191725 to Gladden describes a method of making seitan snack food products, wherein a spongy dough comprising a high amount of wheat gluten is formed into a loaf and subjected to a series of cooling and cooking steps including chilling, boiling, cooling, frying, and drying to produce imitation bacon snack food products with a low water activity of less than 0.85.

U.S. Pat. No. 7,070,827 to Cavallini describes a vegetable protein meat analogue made by a process of sequentially blending methyl cellulose into a water/ice mix to form a cream, then blending in a modified gluten, a vegetable protein product having high solubility in water and capable of forming a gel with mild heat treatment, an oil to make an emulsion base, and a modified food starch and flavoring ingredients to form a flavored emulsion base.

SUMMARY

Meat analogue products for purposes of the present discussion are food products that mimic meat but which contain no animal meat ingredients. Previous attempts at preparing meat analogue products often fall short of the desired organoleptic experience, because they lack one or more of the visual and textural characteristics of the animal meat it is intended to mimic. Moreover, it is particularly challenging to achieve the desired consistency and texture of the meat analogue product while using only non-animal-sourced components, without incorporating a number of additives that present a long ingredient list with names that sound artificial and undesirable to the average consumer.

It has been found that by selection of specific ingredients in effective ratios, and mixing the ingredients in a specific order, a plant-based deli meat analogue product may be prepared having excellent appearance and texture. A plant-based deli meat analogue product is formed in a multi-step method comprising a) mixing water with titanium dioxide to form an aqueous titanium dioxide mixture,
  b) mixing non-gluten plant protein with the aqueous titanium dioxide mixture to form a hydrated non-gluten plant protein,
  c) mixing the hydrated non-gluten plant protein with a plant-based oil and hydrocolloid to form a protein intermediate composition,
  d) mixing the protein intermediate composition with Vital Wheat Gluten to form a protein/gluten mixture intermediate composition,
  e) mixing the protein/gluten mixture intermediate composition with an edible acid to form a plant-based dough, and
  f) dispensing the plant-based dough into a casing to form a dough log, and
  g) cooking the dough log to an internal temp of at least about 180° F. to form a plant-based deli meat analogue product;
  wherein the plant-based deli meat analogue product comprises
    from about 0.5 wt % to about 6 wt % titanium dioxide
    from about 3 wt % to about 20 wt % non-gluten plant protein
    from about 40 wt % to about 87 wt % water
    from about 0.5 wt % to about 6 wt % oil
    from about 2 wt % to about 10 wt % Hydrocolloid
    from about 5 wt % to about 20 wt % Vital Wheat Gluten and
    edible acid in an amount sufficient to provide a plant-based deli meat analogue product having a pH of from about 4.5 to about 7.

While not being bound by theory, it is believed that the titanium dioxide disrupts the matrix structure of the plant-based dough before or during cooking and/or plays a role in gas evolution in the plant-based dough before or during cooking to provide a unique structural profile that affords a perceivable organoleptic improvement in appearance and bite characteristics of the final plant-based deli meat analogue product as compared to like products that do not contain titanium dioxide as described herein.

It has been found that the resulting plant-based deli meat analogue product in an aspect exhibits excellent bite characteristics with a dense texture having a visually observable voids so that the product comprises visible physical discontinuities. In an aspect, the resulting plant-based deli meat analogue product exhibits a visually observable fibrous characteristic that mimics the texture of deli meats. By incorporation of appropriate flavorants and colorants, plant-based deli meat analogue products can be readily prepared that effectively mimic specific deli meat products, such as sliced chicken, turkey, ham or beef.

It has also been found that addition of the edible acid to the intermediate mixture already containing the plant protein and the Vital Wheat Gluten composition in an amount sufficient to provide a dough having a pH of from about 4.5 to about 7 provides a plant-based deli meat analogue product having excellent deli-meat like appearance and texture characteristics. In an aspect, it was found that addition of edible acid lightened the color of the final deli-meat product as compared to like compositions that did not contain the edible acid. In an aspect, it was found that addition of edible acid as the last ingredient added before cooking provides excellent texture properties with a fibrous appearance when the meat analogue is torn apart, in contrast to like compositions wherein the edible acid introduced in an earlier stage of the process. Additionally, it was found that addition of edible acid as the last ingredient added before cooking provides excellent resilience properties when the meat analogue is physically manipulated (e.g., by folding a slice of the product), which is in contrast to like compositions wherein the edible acid introduced in an earlier stage of the process that easily break apart and are "brittle" when physically manipulated.

BRIEF DESCRIPTION OF THE DRAWINGS

The accompanying drawings, which are incorporated in and constitute a part of this application, illustrate several aspects of the invention and together with a description of the embodiments serve to explain the principles of the invention. Where photographs are used, the photograph is provided in grayscale. Counterpart color copies of such grayscale photographs are provided as supplemental content in the present provisional application for reference as appropriate in various jurisdictions and for presentation in jurisdictions that permit submission of drawings in color.

A brief description of the drawings is as follows.

DETAILED DESCRIPTION

Figure 1:
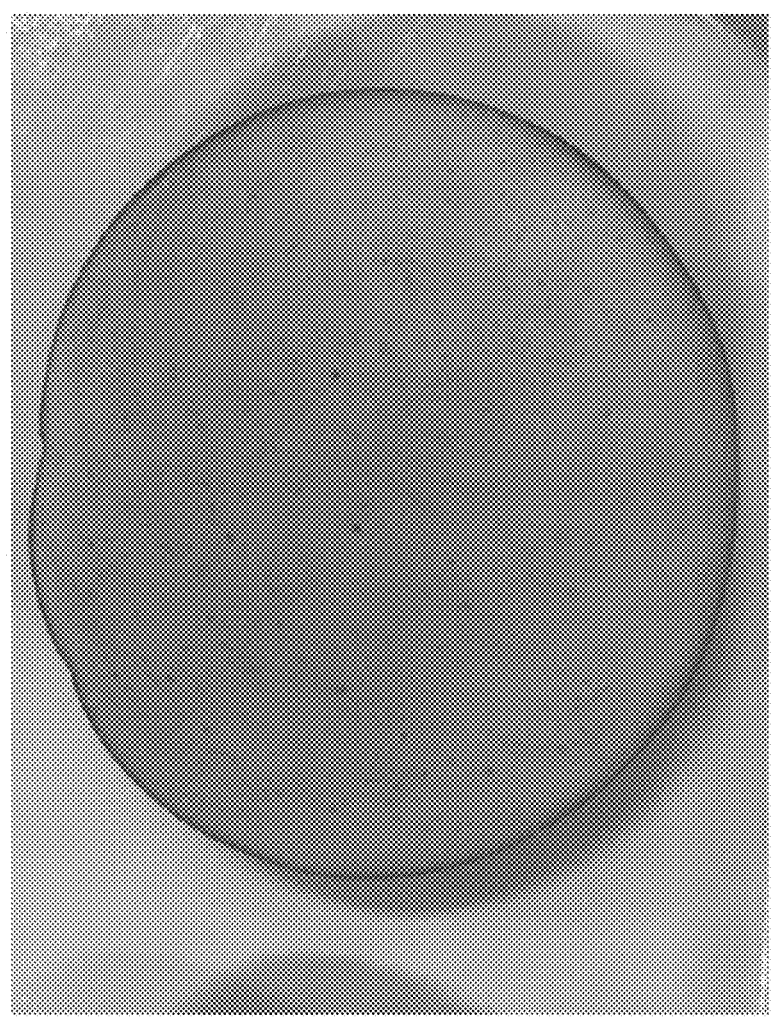
FIG. 1 is a photograph of a comparative plant-based deli meat analogue product that does not contain titanium dioxide.

The aspects of the present invention described below are not intended to be exhaustive or to limit the invention to the precise forms disclosed in the following detailed description. Rather, a purpose of the aspects chosen and described is by way of illustration or example, to facilitate the appreciation and understanding by others skilled in the art of the general principles and practices of the present invention.

As a first step in the present method, water is mixed with titanium dioxide to form an aqueous titanium dioxide mixture, which is then used to hydrate the non-gluten plant protein. It has been found that by introducing titanium dioxide as a first step, the present method assures effective distribution of the titanium dioxide throughout the plant-based deli meat analogue product that is ultimately prepared. It has been found that when the titanium dioxide is added later in the process, i.e. after hydration of the plant protein, after addition of the plant-based oil and hydrocolloid, or after addition of the Vital Wheat Gluten, the desired texture of the final plant-based deli meat analogue product is either unevenly obtained or is not achieved at all.

The titanium dioxide used in the present method is a food grade product that is an ultrafine powder product that is dispersible in water. In an aspect, the titanium dioxide has a particle size of less than about 150 nm. An example of a commercially available food grade titanium dioxide is Kowet titanium dioxide 5000095X25 from Sensient.

The titanium dioxide is added to the water in an amount effective to provide a plant-based deli meat analogue product comprising from about 0.05 wt % to about 3 wt % titanium dioxide. In an aspect, the titanium dioxide is added to the water in an amount effective to provide a plant-based deli meat analogue product comprising from about 0.1 wt % to about 1 wt % titanium dioxide.

The aqueous titanium dioxide mixture is mixed with a non-gluten plant protein to form a hydrated non-gluten plant protein.

In an aspect, the non-gluten plant protein used in the present method is obtained from a plant protein source selected from the group consisting of alfalfa, algal, barley, bean, broad bean, chia, clover, chickpea, corn, cow pea, earth pea, sweet pea, pigeon pea, fava bean, kidney bean, mung bean, navy bean, soy, legume, lentil, lupin, mesquite, cocoa, carob, nut, peanut, pea, almond, potato, cereal, sorghum, fonio, quinoa, hemp, fungal, seaweed, or mixtures thereof. In an aspect, the non-gluten plant protein used in the present method is obtained from a plant protein source selected from the group consisting of bean, broad bean, corn, pea, chickpea, cow pea, earth pea, sweet pea, pigeon pea, fava bean, kidney bean, mung bean, navy bean, soy, legume, lentil, potato, and mixtures thereof.

In an aspect, the non-gluten plant protein used in the present method is obtained from a plant protein source selected from the group consisting of bean, corn, pea, fava bean, soy, potato, and mixtures thereof. In an aspect, the non-gluten plant protein used in the present process is obtained from a plant protein source selected from the group consisting of soy, pea or mixtures thereof. In an aspect, the non-gluten plant protein is pea protein.

Using textured soy protein, textured pea protein, or mixtures thereof has delivered very good results. In an aspect, the non-gluten plant protein is preferably textured pea protein.

In an aspect, the non-gluten plant protein present in the dough does not comprise a mechanically textured protein component (i.e., non-gluten plant protein that has been textured by a mechanical process such as extrusion, shear cell technology, and the like).

In an aspect, the non-gluten plant protein used in the present method is provided in a non-gluten plant protein composition, i.e. a composition comprising the plant protein and non-protein components from the plant protein source. In an aspect, the non-gluten plant protein composition may be a non-gluten plant protein concentrate composition, i.e., the source composition contains not less than 55% protein on a moisture-free basis. The non-gluten plant protein composition may be a non-gluten plant protein isolate composition, i.e., the source composition contains not less than 85% protein on a moisture-free basis.

The non-gluten plant protein composition may include minor amounts of gluten, e.g., up to about 10 wt % of the plant protein in the non-gluten plant protein composition. Preferably, the non-gluten plant protein composition is gluten-free or substantially gluten-free, e.g., less than 2 wt %, less than 1.5 wt %, less than 1 wt %, less than 0.5 wt %, less than 0.1 wt %, 0.001-2 wt %, 0.001-1 wt %, 0.001-0.5 wt %, or 0.001-0.1 wt % of the plant protein in the plant protein non-gluten plant protein composition.

In an aspect, the non-gluten plant protein used in the present method is a powdered non-gluten plant protein having a particle size range of from about 20 to about 150 μm or having a −100 US mesh particle size, i.e., the non-gluten plant protein passes through a US 100 Mesh Size screen, which has a nominal opening size of about 150 μm. In an aspect, the non-gluten plant protein used in the present method is a textured non-gluten plant protein having a particle size range of from about 0.2 to about 20 mm.

In an aspect, the non-gluten plant protein is provided in an amount effective to provide a plant-based deli meat analogue product comprising from about 3 wt % to about 20 wt % non-gluten plant protein. In an aspect, the non-gluten plant protein is provided in an amount effective to provide a plant-based deli meat analogue product comprising from about 4 wt % to about 10 w % non-gluten plant protein. To avoid confusion, it is noted that the identified amount of non-gluten plant protein is the protein content itself without regard to non-protein components that may additionally be present from the plant protein source. By way of example, adding 100 g of a soy protein isolate that is 80 wt % soy protein will contribute 80 g of non-gluten plant protein to the plant-based deli meat analogue.

The plant protein is hydrated by mixing with water in any appropriate vessel, such as a mixer or blender. In an aspect, water is mixed with the plant protein composition in a water:(plant protein) weight ratio of from about 2:1 to about 4:1. In an aspect, water is mixed with the plant protein composition in a water:(plant protein) weight ratio of from about 2.5:1 to about 3.5:1.

In an aspect, water is mixed with the plant protein composition at a water temperature of from about 40° F. to about 90° F. In an aspect, water is mixed with the plant protein composition at a water temperature of from about 40° F. to about 75° F. In an aspect, water is mixed with the plant protein composition at a water temperature of from about 60° F. to about 75° F.

The resultant hydrated non-gluten plant protein is mixed with a plant-based oil and hydrocolloid to form a protein intermediate composition.

In an aspect, the plant-based oil is selected from the group consisting of avocado, canola, coconut, cocoa, corn, cottonseed, flax, olive, palm, palm kernel, peanut, rapeseed, safflower, soya, and sunflower oils and mixtures thereof. Sunflower oil, coconut oil, and mixtures thereof have worked well. In an aspect, the plant-based oil is selected from unsaturated plant-based oils. In an aspect, the plant-based oil is selected from poly-unsaturated plant-based oils.

In an aspect, the plant-based oil is mixed with the hydrated non-gluten plant protein in an amount effective to provide a plant-based deli meat analogue product comprising from about 0.5 wt % to about 6 wt % oil. In an aspect, the plant-based oil is mixed with the hydrated non-gluten plant protein in an amount effective to provide a plant-based deli meat analogue product comprising from about 2 wt % to about 4 wt % oil.

In an aspect, the hydrocolloid incorporated in the plant-based deli meat analogue product is selected from the group consisting of hydrocolloid gums, hydrocolloid starches, hydrocolloid water soluble fibers, and mixtures thereof.

In an aspect, the hydrocolloid present in the plant-based deli meat analogue product comprises at least one hydrocolloid gum component, at least one hydrocolloid starch component, and at least one hydrocolloid water soluble fiber component.

In an aspect, the hydrocolloid gum component is selected from locust bean gum, carrageenan (seaweed extract), guar gum, xanthan gum, gellan gum, scleroglucan, agar, pectin, alginate, gum acacia, and mixtures thereof.

In an aspect, the hydrocolloid water soluble fiber component is selected from water soluble fibers or mixtures of soluble and insoluble fibers, such as konjac glucomannan and citrus fiber.

In an aspect, the hydrocolloid starch component is selected from starches derived from sources including but are not limited to fruits, seeds, and rhizomes or tubers of plants. In an aspect, sources of starch include but are not limited to rice, wheat, corn, potatoes, tapioca, arrowroot, buckwheat, banana, barley, cassava, kudzu, oca, sago, sorghum, sweet potatoes, taro and yams. In an aspect, the starch is selected from cassava starch, tapioca starch, and mixtures thereof.

In an aspect, the starch may be one or more modified starches, i.e. a starch that has been altered from its native state, resulting in modification of one or more of its chemical or physical properties. Starches may be modified, for example, by enzymes, oxidation or, substitution with various compounds. Starches can be modified to increase stability against heat, acids, or freezing, improved texture, increase or decrease viscosity, increase or decrease gelatinization times, and increase or decrease solubility, among others. Modified starches may be partially or completely degraded into shorter chains or glucose molecules, or modified by substitution to have a different chemical composition. In an aspect, the starch may be a nOSA starch, i.e. a modified starch that has been partially substituted with n-octenyl succinic anhydride.

In an aspect, the plant-based oil and hydrocolloid may be mixed with the hydrated non-gluten plant protein at the same time, or either component may be mixed with the hydrated non-gluten plant protein before the other component.

In an aspect, the hydrocolloid is mixed with the hydrated non-gluten plant protein in an amount effective to provide a plant-based deli meat analogue product comprising from about 1.5 wt % to about 10 wt % hydrocolloid. In an aspect, the hydrocolloid is mixed with the hydrated non-gluten plant protein in an amount effective to provide a plant-based deli meat analogue product comprising from about 1.5 wt % to about 5 wt % hydrocolloid.

In an aspect, the hydrocolloid comprises:

from about 0.1 wt % to about 5 wt % carrageenan from about 0.1 wt % to about 5 wt % konjac glucomannan from about 0.1 wt % to about 5 wt % citrus fiber from about 0.1 wt % to about 5 wt % tapioca starch, all amounts based on the total amount of plant-based deli meat analogue product.

For purposes of the present disclosure, "Vital Wheat Gluten" refers to a protein extract of wheat flour prepared by removing a significant portion of the starch, fibers, pentosans and water-soluble materials from wheat flour. Vital Wheat Gluten is commercially available, and may be obtained by any appropriate process such as, for example, as disclosed in U.S. Pat. No. 3,790,553. In an aspect, Vital Wheat Gluten has a protein content of 70% to 99% dry weight. In an aspect, Vital Wheat Gluten has a protein content of about 75% to about 80% dry weight. However, one skilled in the art will recognize that gluten is the protein found and/or derived from wheat, barley, rye, oats, and related species and/or hybrids of wheat, barley, rye, and oat. As used herein, "gluten" refers to gluten from such plant sources, as well as mixtures of glutens from such plant sources. For sake of clarity, though, "gluten" as used herein does not refer to protein from corn or rice even though the terms "corn gluten" and "rice gluten" are used in some contexts, e.g., in animal feed.

In an aspect, the Vital Wheat Gluten is mixed with the protein intermediate composition in an amount effective to provide a plant-based deli meat analogue product comprising from about 10 wt % to about 20 wt % Vital Wheat Gluten. In an aspect, the Vital Wheat Gluten is mixed with the protein intermediate composition in an amount effective to provide a plant-based deli meat analogue product comprising from about 12 wt % to about 18 wt % Vital Wheat Gluten. To avoid confusion, it is noted that this identified amount of Vital Wheat Gluten is the gluten protein content itself without regard to non-protein components that may additionally be present from the Vital Wheat Gluten source. By way of example, adding 100 g of a wheat protein concentrate that is 75 wt % gluten will contribute 75 g of Vital Wheat Gluten to the plant-based deli meat analogue.

For purposes of the present disclosure, an "edible acid" may be any acid suitable to be used in food. In an aspect, the acid is selected from the group consisting of citric acid, lactic acid, acetic acid, or mixtures thereof. In an aspect, the acetic acid is provided as vinegar.

In an aspect, the edible acid is incorporated in an amount sufficient to provide a dough having a pH of from about 4.5 to about 7. In an aspect, the edible acid is incorporated in an amount sufficient to provide a dough having a pH of from about 5.5 to about 6.5. In an aspect, the edible acid is incorporated in an amount sufficient to provide a dough having a pH of from about 5.5 to about 6. In an aspect, the edible acid is incorporated in an amount sufficient to provide a dough having a pH of from about 6 to about 6.5. In an aspect, an acid is additionally incorporated during mixing of the dough in an amount sufficient to provide a dough having a pH of from about 4.5 to about 5.5.

In an aspect the plant-based deli meat analogue product is a sausage mimic, which characteristically has a pH in the range of from about 4.5 to 5.5.

In an aspect, the plant-based deli meat analogue product comprises edible acid in an amount of from about 0.5 wt % to about 5 wt %.

In an aspect, the plant-based deli meat analogue product may include includes one or more additional ingredients to meet desired product characteristics. In an aspect, the additional ingredient(s) is selected from flavors, colorants, preservatives (i.e., an ingredient to prevent or retard microbiological growth and/or spoilage), stabilizers, vitamins, and minerals and mixtures thereof.

In an aspect, the plant-based deli meat analogue product comprises seasonings selected from paprika, garlic, cayenne, chili pepper, black pepper, nutmeg, allspice, celery seed, coriander, myrtle berries, and mixtures thereof.

In an aspect, the plant-based deli meat analogue product comprises seasonings selected from paprika, garlic, cayenne, chili pepper, black pepper, nutmeg, allspice, celery seed, coriander, myrtle berries, and mixtures thereof.

In an aspect, the plant-based deli meat analogue product comprises sugar and/or salt.

In an aspect, the plant-based deli meat analogue product is formulated with flavor ingredients selected to mimic the flavor of a meat-based dough product. In an aspect, the plant-based deli meat analogue product is formulated with flavor ingredients selected to mimic the flavor of beef. In an aspect, the plant-based deli meat analogue product is formulated with flavor ingredients selected to mimic the flavor of pork. In an aspect, the plant-based deli meat analogue product is formulated with flavor ingredients selected to mimic the flavor of chicken. In an aspect, the plant-based deli meat analogue product is formulated with flavor ingredients selected to mimic the flavor of turkey.

In an aspect, the plant-based deli meat analogue product is formulated with flavor ingredients selected to provide a flavor profile that is not a meat flavor.

In an aspect, the plant-based deli meat analogue product comprises colorant ingredients, which may be natural colorant ingredients. In an aspect, the plant-based deli meat analogue product comprises fruit or vegetable juices as a natural colorant, such as beet, radish, or pomegranate juice.

In an aspect, one or more of the additional ingredients may be introduced to the plant-based dough before or at the same time as introduction of the oil and hydrocolloid, or before or at the same time as introduction of the Vital Wheat Gluten, or before or at the same time as introduction of the edible acid, or after introduction of the edible acid and before dispensing of the plant-based dough into a casing.

In an aspect, the additional ingredients that are oil soluble flavors/colors may be added to the oil prior mixing with other ingredients. In an aspect, the additional ingredients that are liquid water-soluble flavors/colors may be added to the water prior to mixing with other ingredients.

In an aspect, the additional ingredients comprise a calcium salt, such as calcium lactate, calcium citrate, or calcium chloride. It has been found that plant-based deli meat analogue products as described herein comprising a calcium salt exhibits an enhanced structural profile that affords a perceivable organoleptic improvement in appearance and bite characteristics of the final plant-based deli meat analogue product as compared to like products that do not contain calcium salt as described herein.

In an aspect, the calcium salt is present in an amount effective to provide a plant-based deli meat analogue product comprising from about 0.05 wt % to about 1 wt % calcium salt. In an aspect, the calcium salt is present in an amount effective to provide a plant-based deli meat analogue product comprising from about 0.1 wt % to about 0.5 wt % calcium salt.

Any suitable mixing device may be used carry out the above discussed mixing steps to prepare the plant-based deli meat analogue product. Examples of suitable equipment include blenders or mixing devices that use an impeller such as a paddle blender. In an aspect, the mixer is configured and operated in a manner such that the mixer does not impart excess bulk pressure to the composition being mixed. It has been found that application of excess pressure in bulk to the composition results in production of an overly dense product that does not meet texture expectations. In an aspect, the mixing is not carried out in an extruder exerting 1.5 MPa or more of pressure.

The protein/gluten mixture intermediate composition is mixed with the edible acid. It has been found that when the analogue dough is mixed with Vital Wheat Gluten under pH neutral conditions, the dough becomes very stiff and unsuitable for use in forming a sausage, and additionally does not absorb water well. In contrast, when the analogue dough is mixed with Vital Wheat Gluten together with the edible acid, gluten strands are developed to provide elastic strands that do not unduly increase the viscosity of the dough. It has been found that mixing of the protein/gluten mixture intermediate composition with the edible acid under these conditions imparts an elastic structure to the plant-based dough, providing an enhanced meat-like texture in the final plant-based deli meat analogue product. Additionally, when the analogue dough is mixed with Vital Wheat Gluten together with the edible acid, the resulting composition does absorb water well, providing a dough that absorbs water during mixing, and is easily manipulated for mixing with additional ingredients and dispensing into a casing for cooking.

In an aspect, the protein/gluten mixture intermediate composition is mixed with the edible acid under gluten strand development shear conditions, (i.e. under sufficient shear to provide a dough that stretches when physically pulled apart, and wherein all water is absorbed in the dough when water is present as 50% of the dough formulation.

In an aspect, the mixing under gluten strand development shear conditions is carried out using a high shear mixer. In an aspect, the mixing apparatus is a food chopper, bowl chopper, or food processor.

For purposes of the present description, a food chopper is a food cutter having a surface for receiving food to be cut, and one or more vertically movable cutting blades configured to chop the plant-sourced composition into pieces.

In an aspect, the mixing apparatus is a bowl chopper. For purposes of the present description, a bowl chopper is a food cutter having a rotary bowl for receiving food to be cut, and one or more vertically oriented blades (also described as "knives" in the art) attached to a horizontally oriented rotary knife shaft. The rotary bowl rotates around a vertical axis, and the blades cut by rotation of the horizontally oriented rotary knife shaft. The blades are aligned relative to the internal wall or walls of the bowl such that they may chop and mix the food within the bowl. While the lateral position of the rotary knife shaft is substantially stationary, the bowl and the contents therein rotate relative to the blades whereby the contents are continuously moved against the blades as the bowl is rotating. In an aspect, the blades may be run in only a forward direction, or in an aspect run in both a forward direction and a reverse direction. Bowl choppers are commercially available, and are described, for example, in U.S. Pat. No. 5,996,917, the disclosure of which is incorporated herein by reference. The use of a bowl chopper in the present process is particularly advantageous, because it efficiently performs a cutting function as it mixes the material.

In an aspect, the mixing apparatus is a food processor. For purposes of the present description, a food processor is a food mixer having a food container for receiving food to be mixed that is fitted with a hub configured to be coupled to a drive shaft of the food processor. One or more blades are rotatably coupled to the hub. If so desired, the blades may have an edge that is suitable to cut the food in the food container. In the case of the food processor, the blades are horizontally oriented, and the hub and drive shaft are generally vertically oriented. In an aspect, the blades may be run in only a forward direction, or in an aspect run in both a forward direction and a reverse direction. Such food processors are commercially available. In an aspect, the food processor is a Robo coupe type food processor.

In an aspect, a vacuum is applied to the plant-based dough or other intermediate at any appropriate stage of the preparation method to degas the dough or intermediate in an amount sufficient to remove or substantially reduce undesired air pockets or bubbles. Air pockets and bubbles can adversely impact the visual appeal and texture of the deli meat analogue. Any suitable vacuum system may be used to "degas" the dough or intermediate to remove air pockets.

In an aspect, after being mixed, but prior to being dispensed into a casing, the dough has a shiny and elastic consistency indicating that it is ready to be dispensed into a casing.

In an aspect, additional food particles such as cheese, vegetable or fruit pieces are incorporated in the dough, preferably after mixing the dough but prior to being dispensed into a casing. If so desired, though, such food particles may be added earlier in the process. Examples of vegetable pieces that may be incorporated include pepper, dried tomato, pickle, and pimento pieces.

The plant-based dough is then dispensed into a casing to form a dough log.

In an aspect, the casing is an artificial casing. In an aspect, the casing is an artificial casing manufactured from natural materials. In an aspect, the casing is an artificial casing made of natural materials selected from cellulosic casings and collagen casings. In an aspect, the casing is an artificial casing made of natural materials that is permeable to gases, smoke and water vapor. In an aspect, the artificial casings made of natural materials are edible, and therefore do not need to be removed from the encased plant-based deli meat analogue product when being eaten by a consumer.

In an aspect, the casing is an artificial casing manufactured from synthetic substances. In an aspect, the casing is an artificial casing manufactured from thermoplastic materials ("synthetic casings"). In an aspect, the synthetic casings are mechanically strong, relatively heat resistant, impermeable to smoke, gases and water vapor.

In an aspect, the casing is prepared from a material selected from polyamide (PA), polyethylene (PE), polypropylene (PP), polyvinylidene chloride (PVDC) and polyester (PET). The above-mentioned categorization of casings is disclosed in the FAO (Food and Agriculture Organization of the United Nations) Corporate Document Repository under the Title "Meat processing technology for small and medium-scale producers" under the keyword "Casings".

In an aspect, the casing made of a mono- or multilayered film of which at least one layer comprises a film-forming synthetic polymer.

In an aspect, the casing made of a mono- or multilayered film of which at least one layer comprises a film-forming synthetic polymer. Such casings for processed meat products are well known in the art. In an aspect, the casings, such as sausage casings, are typically made of 1-5 layered films. In an aspect, the film-forming polymer of at least one film layer is a thermoplastic synthetic polymer. In an aspect, the thermoplastic synthetic polymer is a polyamide, polyethylene, polypropylene, polyvinylidene chloride or polyester. In an aspect, the film layer can contain adjuvants, such as plasticizers, colorants or other known additives, but they should not substantially affect the film-forming properties of the synthetic polymer and other properties that are provided by the synthetic polymer to the casing, such as its known impermeability to smoke, water vapor or other gases. In an aspect, the water vapor impermeable casings have water vapor permeability of not more than 10 g/m$^2$·d, or not more than 9 g/m$^2$·d, measured according to DIN 53122 at 38° C. and 100% relative humidity. A wide variety of water vapor impermeable casings are disclosed in the art, e.g., in European Patent Application Nos. EP 0 603 676 and EP 1 817 962 and in International Patent Application Nos. WO 2005/11323 and WO 2017/192445; the disclosures of which are incorporated herein by reference with respect to the discussions regarding the preparation, identity and use of casings provided therein.

In an aspect, the casing is permeable to water vapor.

In an aspect, when the casing is filled, the casing generally has about cylindrical shape, but other cross-sections may also be suitable.

In an aspect, the thus-prepared encased uncooked dough log is then cooked to an internal temperature of at least about 180° F., e.g., at least about 190° F. or at least about 195° F., to form an encased cooked dough log. In an aspect, the thus-prepared encased uncooked dough log is then cooked to an internal temperature of from about 180° F. to about 220° F., e.g., from about 185° F. to about 210° F. or from about 190° F. to about 210° F., to form an encased cooked dough log.

In an aspect, the casing is permeable to water vapor. It has been found that cooking of an encased uncooked dough log having a water vapor permeable casing in a steam oven is particularly effective in achieving the desired texture properties of the final cooked product. While not being bound by theory, it is believed that cooking of the described encased uncooked dough log in the presence of steam facilitates a desired degree of gelling of the protein and additional ingredients in the dough log, thereby affording a final plant-based deli meat analogue product exhibiting excellent texture and other organoleptic properties. In an aspect, the encased uncooked dough log may be then cooked in a steam oven at humidity greater than 80% at an oven temp of from about 180° F. to about 220° F.

The thus-prepared encased cooked dough log may be chilled to an internal temperature of from about 30° F. to about 45° F. for storage purposes as appropriate.

It has additionally been found that chilling the dough log facilitates removal of the casing from the cooked dough log. While not being bound by theory, it is believed that chilling enhances the textural difference and/or reduces the adhesion of the cooked dough log and the casing so that removal of the casing can be carried out without damage to the surface of the cooked dough log. In an aspect, encased cooked dough log is chilled to an internal temperature of from about 30° F. to about 40° F. In an aspect, encased cooked dough log is chilled to an internal temperature of from about 30° F. to about 36° F.

In an aspect, after the chilling of the encased cooked dough log, the casing may be removed by a suitable process to provide a non-encased plant-based dough log product.

In an aspect, the plant-based deli meat analogue product is provided in overwrapped trays. This package type features air permeable overwrap with plant-based deli meat analogue product placed on an absorbent pad in a foam or plastic tray. In an aspect, the product is provided in a case ready tray, wherein the plant-based deli meat analogue product is packaged and sealed at the plant in a plastic-lidded package. In an aspect, the product is provided in chubs, wherein the plant-based deli meat analogue product is packaged for slicing at the point of purchase (e.g. at a deli counter) or point of use (e.g. at a restaurant or by the home user). In an aspect, the product is provided in the casing in which it was cooked. In an aspect, the plant-based deli meat analogue product is packaged in any such format in sizes of 0.25 lb, 0.5 lb, 1 lb., 2 lb., 3 lb., 5 lb. and 10 lb.

In an aspect, the plant-based deli meat analogue product does not contain animal-sourced materials of any kind.

In an aspect, the process of preparing the plant-based deli meat analogue product does not include an extrusion step that exceeds a pressure of 1.5 MPa. In an aspect, the process of preparing the plant-based deli meat analogue product does not include an extrusion step.

In an aspect, the plant-based deli meat analogue product contains no more than 1 wt % of methylcellulose. In an aspect, the plant-based deli meat analogue product does not contain methylcellulose.

EXAMPLES

Example 1—Comparative Plant-Based Deli Meat Analogue Product without Titanium Dioxide Ingredients as shown in Tables 1 and 2 were obtained and a plant-based deli meat analogue product was prepared using Process Methodology 1 described below.

TABLE 1

| | | | | Blend A | |
| --- | --- | --- | --- | --- | --- |
| | Ingredient Information | | | Formulation | |
| Type | Ingredient Description | Supplier | | WT | 100% formula |
| Liq. | Water | | | 59.0500 | 59.496% |
| Dry | SUPRO ® EX45 IP Isolated Soy Protein (10004249) | Solae | | 7.5000 | 7.557% |
| Liq. | RBWD MID OEUC SUNFLOWER OIL (52534/ 1000185485) | PDM/Cargill GEOS | | 3.0000 | 3.023% |
| Dry | TURKEY TYPE DELI SEASONING REDUCED COLOR No smk 1201840 | Griffith | | 4.0000 | 4.030% |
| Dry | Carrageenan Aubey gel 1014 (100003010) | Cargill Texturizing Solutions Inc. | | 2.0000 | 2.015% |
| Dry | Citri-Fi ® 100 | Fiber Star | | 0.7000 | 0.705% |
| Dry | Hi Grade Granulated Salt (1000125251 | Cargill Salt | | 0.8000 | 0.806% |
| Dry | FlakeSelect Potassium Chloride Fine with 1.25% TCP (100046226) | Cargill | | 0.4000 | 0.403% |
| Dry | Calcium lactate PURACAL ® PP/USP (1220400700) | Corbion (Purac) | | 0.3000 | 0.302% |

TABLE 1-continued

| | | Blend A | | |
|---|---|---|---|---|
| | Ingredient Information | | Formulation | |
| Type | Ingredient Description | Supplier | WT | 100% formula |
| Dry | Pure Cane Sugar (811620) | US Sugars Corp. | 1.0000 | 1.008% |
| Dry | CreamGel 70001 | Cargill Starch & Sweeteners Thailand/Cargill Siam Limited | 1.5000 | 1.511% |
| Dry | Wheat Gluten (Gluvital 21020) | Cargill Deutschland GmbH | 19.0000 | 19.144% |
| | TOTALS | | 99.250 | 100.00% |

;1

TABLE 2

| | | final mixture | | |
|---|---|---|---|---|
| | Ingredient Information | | Formulation | |
| Type | Ingredient Description | Supplier | WT | 100% Formula |
| Dry | Blend A | | 99.2500 | 99.250% |
| Liq. | Woeber's Distilled White Vinegar - 200 Grain (74680-00249-55) | Woeber Mustard Manufacturing Company | 0.7500 | 0.750% |
| | TOTALS | | 100.00 | 100.00% |

Process Methodology 1.

a) Mixing Blend (Fatosa Mixer):
  1. Add water to the mixer.
  2. Add Soy Protein isolate into the mixer.
  3. Mix well to hydrate all the SPI properly (3 min).
  4. Add Oil and mix well (2.5 min).
  5. Add all the flavors and mix well (2.5 min).
  6. Add all hydrocolloids (Citrifi+carrageenan) and mix well (2.5 min).
  7. Add salts, Sugar, Calcium lactate, and tapioca starch and mix well (3 min).
  8. Add vital wheat gluten and mix for 2 min.
  9. Transfer the paste into the robot Coupe/bowl chopper.

b) Emulsification (Robot Coupe/Bowl Chopper)
  1. Add vinegar to the blend.
  2. Run the bowl chopper at speed 3 (800 RPM) & 4 (1600 RPM) alternatively until it forms an elastic stringy texture.
  3. Pull vacuum partially on chamber vac/bowl chopper.

c) Stuffing (658 Handtmann Stuffer):
  1. Set up the stuffer-use alternative veins only.
  2. Add the vacuum pulled blend into the stuffer (Use smallest 1" stuffing horn).
  3. Stuff into the Viscofan plastic/High barrier smoke casing M20-07422-500062197 BTC 150.0 000 00 53, 500 000000 089 00 (P20-0224).

3. Shape—round.
  4. Cook & chill.

Cooking:
  1. Cook logs in the pilot plant oven according to the cook cycle below.
    1st step: 160 F at 100% humidity for 30 min
    2nd Step: 180 F at 100% humidity for 60 min.
    3rd Step: 200 F at 100% humidity for until 180 F internal temp
    4th Step: 200 F at 100% humidity for 90 min (>196 F).
    5th Step: 30 min Cold shower with 100% fan
  2. Chill according to USDA chilling requirement.

Slicing and Packaging:
  1. Slice thickness 1.6 mm; Straight stack—0.5 lb, 15 slices/stack).
  2. Vacuum package in Multivac 4-up (Regular film-top film; bottom film)

Boxing and Storage:
  1. Box and store in the freezer

Example 2—Plant-Based Deli Meat Analogue Product Comprising Titanium Dioxide

Ingredients as shown in Tables 3 and 4 were obtained and a plant-based deli meat analogue product was prepared using Process Methodology 2.

TABLE 3

| | Ingredient Information | | Formulation | |
|---|---|---|---|---|
| | Blend A | | | |
| Type | Ingredient Description | Supplier | WT | 100% formula |
| Liq. | Water | | 58.8000 | 59.244% |
| Dry | Kowet Titanium Dioxide 500095X25 | Sensient | 0.2500 | 0.252% |
| Dry | SUPRO ® EX 45 IP Isolated Soy Protein (10004249) | Solae | 7.5000 | 7.557% |
| Liq. | RBWD MID OELIC SUNFLOWER OIL (52534/100085485) | PDM/Cargill GEOS | 3.0000 | 3.023% |
| Dry | TURKEY TYPE DELI SEASONING REDUCED COLOR No smk 1201840 | Griffith | 4.0000 | 4.030% |
| Dry | Carrageenan Aubey gel 1014 (100003010) | Cargill Texturizing Solutions Inc. | 2.0000 | 2.015% |
| Dry | Citri-Fi 100 | Fiber Star | 0.7000 | 0.705% |
| Dry | Hi Grade Granulated Salt (100012525) | Cargill Salt | 0.8000 | 0.806% |
| Dry | FlakeSelect Potassium Chloride Fine with 1.25% TCP (100046226) | Cargill | 0.4000 | 0.403% |
| Dry | Calcium lactate PURACAL ® PP/USP (1220400700) | Corbion (Purac) | 0.3000 | 0.302% |
| Dry | Pure Cane Sugar (811620) | US Sugars Corp. | 1.0000 | 1.008% |
| Dry | CreamGel 70001 | Cargill Starch & Sweeteners Thailand/Cargill Siam Limited | 1.5000 | 1.511% |
| Dry | Wheat Gluten (Gluvital 21020) | Cargill Deutschland GmbH | 19.0000 | 19.144% |
| | TOTALS | | 99.250 | 100.00% |

TABLE 4

| | Ingredient Information | | Formulation | |
|---|---|---|---|---|
| | final mixture | | | |
| Type | Ingredient Description | Supplier | WT | 100% Formula |
| Dry | Blend A | | 99.2500 | 99.250% |
| Liq. | Woeber's Distilled White Vinegar - 200 Grain (74680-00249-55) | Woeber Mustard Manufacturing Company | 0.7500 | 0.750% |
| | TOTALS | | 100.00 | 100.00% |

Process Methodology 2.

Processing Steps:

a) Making Blend A (Ultrasource Fatosa):
  1. Mix TiO2 in the water.
  2. Add SPI into the mixer.
  3. Add water_TiO2 mix into the mixer and mix well to hydrate all the SPI properly (3 min).
  4. Add Oil and mix well (2.5 min).
  5. Add all the flavors and mix well (2.5 min).
  6. Add all hydrocolloids (Citrifi+carrageenan) and mix well (2.5 min).
  7. Add salts, Sugar, Calcium lactate, and ta pica starch and mix well (3 min).
  8. Add vital wheat gluten and mix for 2 min.
  9. Transfer the paste into the Bowl chopper.

b) Bowl Chopper:
  1. Add vinegar to the blend.
  2. Run the bowl chopper at speed 3 (800 RPM) & 4 (1600 RPM) alternatively until it forms an elastic stringy texture.
  3. Pull vacuum partially on chamber vac/bowl chopper.

c) Stuffing (658 Handtmann Stuffer):
  1. Add the vacuum pulled blend into the stuffer (Use smallest 1" stuffing horn).
  2. Stuff into the Viscofan plastic smoke casing M20-07422-500062197 BTC 150.0000 00 53,500 000000089 00 (P20-0224).
  3. Shape-round.
  4. Cook on the same day processing.

Cooking:
1. Cook logs in the pilot plant oven according to the cook cycle below.
1st step: 160 F at 100% humidity for 30 min
2nd step: 180 F at 100% humidity for 60 min
3rd Step: 200 F at 100% humidity for until 180 F internal temp
4th Step: 200 F at 100% humidity for 90 min (>196 F).
5th Step: 60 min Cold shower with 100% fan
2. Chill According to USDA Chilling Requirement.
Slicing and Packaging:
1. Slice on Webber Slicer. (Slice thickness 1.7 mm; Straight stack—0.5 lb, 15 slices/stack).
2. Vacuum package in Multivac 4-up (Regular film—top film—P20-0230; bottom film—P20-0245).

Example 3 Product Comparison

Figure 2:
FIG. 2 is a photograph of a plant-based deli meat analogue product containing titanium dioxide.

FIG. 1 is a photograph showing the product of Comparative Example 1, and FIG. 2 is a photograph showing the product of Example 2 that is plant-based deli meat analogue product comprising titanium dioxide. As can be seen in the photos, the product of Comparative Example 1 has little to no observable texture, and has an overall dense appearance with a surface that appears to be uniform and without voids or apparent fiber structure.

In contrast, the product of Example 2 comprising titanium dioxide is lighter in color, has a surface comprising visually observable voids so that the product comprises visible physical discontinuities.

Figure 3:
FIG. 3 is a photo of a plant-based roast beef style deli meat analogue product that has been manually torn apart to reveal edge structure.

FIG. 3 is a photo of a plant-based roast beef style deli meat analogue product made generally as described in the process of Example 2 with beef flavor and color ingredients. In this process, the gluten and acid components were added last, which, as discussed above provides excellent texture properties in the final meat analogue product. As can be seen in the figure, when this roast beef style deli meat analogue product has been manually torn apart. The torn edges of the meat are ragged, with visible microfiber-like strands extending from the meat, giving the general appearance of a sliced deli meat product having a fibrous texture.

Product Evaluations

The products produced by Comparative Example 1 without titanium dioxide and Example 2 with titanium dioxide were evaluated for flavor, texture, bite and visibility of fibers. The Comparative Example 1 product was found to exhibit good flavor, good texture comparable to highly processed animal protein bite, and was found to have detectable fibrous strands contributing to the meat-like appearance.

The products produced by Example 2 with titanium dioxide were found to exhibit good flavor and good texture, and additionally had a lighter color and has more easily detectable fibrous strands and enhanced discontinuities in the product, contributing to a superior meat-like appearance.

As used herein, the terms "about" or "approximately" mean within an acceptable range for the particular parameter specified as determined by one of ordinary skill in the art, which will depend in part on how the value is measured or determined, e.g., the limitations of the sample preparation and measurement system. Examples of such limitations include preparing the sample in a wet versus a dry environment, different instruments, variations in sample height, and differing requirements in signal-to-noise ratios.

All patents, patent applications (including provisional applications), and publications cited herein are incorporated by reference as if individually incorporated for all purposes. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of preparing a plant-based deli meat analogue product comprising
a) mixing water with titanium dioxide to form an aqueous titanium dioxide mixture,
b) mixing non-gluten plant protein with the aqueous titanium dioxide mixture to form a hydrated non-gluten plant protein,
c) mixing the hydrated non-gluten plant protein with a plant-based oil and hydrocolloid to form a protein intermediate composition,
d) mixing the protein intermediate composition with Vital Wheat Gluten to form a protein/gluten mixture intermediate composition,
e) mixing the protein/gluten mixture intermediate composition with an edible acid to form a plant-based dough,
f) dispensing the plant-based dough into a casing to form a dough log,
g) cooking the dough log to an internal temp of at least about 180° F. to form a plant-based deli meat analogue product;
wherein the plant-based deli meat analogue product, based on the total amount of plant-based deli meat analogue product, comprises:
from about 0.05 wt % to about 3.0 wt % titanium dioxide,
from about 3 wt % to about 20 wt % non-gluten plant protein,
from about 40 wt % to about 87 wt % water,
from about 0.5 wt % to about 6 wt % oil,
from about 2 wt % to about 10 wt % Hydrocolloid,
from about 5 wt % to about 20 wt % Vital Wheat Gluten, and
edible acid in an amount sufficient to provide a plant-based deli meat analogue product having a pH of from about 4.5 to about 7.

2. The method of claim 1, wherein the plant-based deli meat analogue product is chilled after cooking to an internal temperature of from about 30° F. to about 45° F.

3. The method of claim 1, wherein the titanium dioxide has a particle size of less than about 150 nm.

4. The method of claim 1, wherein the titanium dioxide is added to the water in an amount effective to provide the plant-based deli meat analogue product comprising from about 0.1 wt % to about 1 wt % titanium dioxide.

5. The method of claim 1, wherein the non-gluten plant protein is obtained from a plant protein source selected from the group consisting of: soy, pea and mixtures thereof.

6. The method of claim 1, wherein the plant-based oil is selected from the group consisting of: avocado, canola, coconut, cocoa, corn, cottonseed, flax, olive, palm, palm kernel, peanut, rapeseed, safflower, soya, sunflower oils, and mixtures thereof.

7. The method of claim 1, wherein the hydrocolloid comprises at least one hydrocolloid gum component, at least one hydrocolloid starch component, and at least one hydrocolloid water soluble fiber component.

8. The method of claim 1, wherein the hydrocolloid comprises a starch selected from the group consisting of Cassava starch, tapioca starch, and mixtures thereof.

9. The method of claim 1, wherein the hydrocolloid comprises:

from about 0.1 wt % to about 5 wt % carrageenan, from about 0.1 wt % to about 5 wt % konjac glucomannan, from about 0.1 wt % to about 5 wt % citrus fiber, and from about 0.1 wt % to about 5 wt % tapioca starch, based on the total amount of plant-based deli meat analogue product.

10. The method of claim 1, wherein the plant-based deli meat analogue product has a pH of from about 5.5 to about 6.5.

11. The method of claim 1, wherein the plant-based deli meat analogue product comprises edible acid in an amount of from about 0.5 wt % to about 5 wt %.

12. The method of claim 1, wherein the edible acid is selected from the group consisting of: citric acid, lactic acid, acetic acid, and mixtures thereof.

13. The method of claim 1, wherein the method further comprises in step (c): mixing one or more additional ingredients with the hydrated non-gluten plant protein and the plant-based oil and hydrocolloid to form the protein intermediate composition.

14. The method of claim 13, wherein the one or more additional ingredients is selected from the group consisting of: ham, beef, turkey and chicken.

15. The method of claim 13, wherein the one or more additional ingredients comprises calcium salt in an amount effective to provide the plant-based deli meat analogue product comprising from about 0.05 wt % to about 1 wt % calcium salt.

* * * * *